(12) United States Patent
Nakamura et al.

(10) Patent No.: US 9,021,089 B2
(45) Date of Patent: Apr. 28, 2015

(54) NETWORK MONITORING CONTROL APPARATUS AND MANAGEMENT INFORMATION ACQUISITION METHOD

(75) Inventors: Toshihiro Nakamura, Kawasaki (JP); Gaku Todokoro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 174 days.

(21) Appl. No.: 13/476,291

(22) Filed: May 21, 2012

(65) Prior Publication Data

US 2013/0031246 A1 Jan. 31, 2013

(30) Foreign Application Priority Data

Jul. 25, 2011 (JP) .................................. 2011-162627

(51) Int. Cl.
*G06F 15/173* (2006.01)
*H04L 12/24* (2006.01)
*H04L 12/26* (2006.01)

(52) U.S. Cl.
CPC ......... *H04L 41/0695* (2013.01); *H04L 43/0882* (2013.01); *H04L 41/0654* (2013.01); *H04L 41/0213* (2013.01)

(58) Field of Classification Search
CPC ......... H04L 47/00; H04L 47/10; H04L 47/12; H04L 12/569; H04L 12/2692; H04L 47/29; H04L 47/30; H04L 43/16; H04L 29/06884; H04L 41/0654; H04L 41/0695; H04L 41/0213; H04L 43/0882
USPC ......... 709/208, 211, 220, 221, 223, 224, 225, 709/235
See application file for complete search history.

(56) References Cited

U.S. PATENT DOCUMENTS

| | | | | |
|---|---|---|---|---|
| 6,704,284 | B1* | 3/2004 | Stevenson et al. | 370/241 |
| 2001/0052010 | A1* | 12/2001 | Kim | 709/224 |
| 2003/0235153 | A1* | 12/2003 | Lee et al. | 370/229 |
| 2004/0205186 | A1* | 10/2004 | Gaspard | 709/224 |
| 2005/0052994 | A1* | 3/2005 | Lee | 370/230 |
| 2005/0272423 | A1* | 12/2005 | Stephens et al. | 455/434 |
| 2008/0239957 | A1* | 10/2008 | Tokura et al. | 370/235 |
| 2010/0057901 | A1* | 3/2010 | Ozaki | 709/223 |
| 2010/0088402 | A1* | 4/2010 | Shibata | 709/223 |

(Continued)

FOREIGN PATENT DOCUMENTS

| | | |
|---|---|---|
| AU | 781354 | 5/2005 |
| JP | 9-282252 | 10/1997 |
| JP | 2001-160013 | 6/2001 |

(Continued)

OTHER PUBLICATIONS

Japanese Patent Office Action dated Mar. 3, 2015 for corresponding Japanese Patent Application No. 2011-162627.

*Primary Examiner* — Jude Jean Gilles
*Assistant Examiner* — Johnny Aguiar
(74) *Attorney, Agent, or Firm* — Staas & Halsey LLP

(57) ABSTRACT

A network monitoring control apparatus includes: a traffic information acquisition unit to acquire traffic information of a network component included in a network; a decision information switching unit to set decision information for the network component based on a comparison result between the traffic information and one of a congestion decision threshold and a congestion recovery decision threshold of the network component; and a management information acquisition unit to acquire management information of the network component based on the decision information.

12 Claims, 11 Drawing Sheets

(56) References Cited

U.S. PATENT DOCUMENTS

2011/0176437 A1* 7/2011 Sekiguchi ............... 370/252
2012/0017279 A1* 1/2012 Wakumoto ............... 726/24

FOREIGN PATENT DOCUMENTS

| JP | 2003-244142 | 8/2003 |
| JP | 2006-325118 | 11/2006 |

* cited by examiner

FIG. 4

| NEID | PORT ID | BAND USE RATIO | UPPER LIMIT THRESHOLD | LOWER LIMIT THRESHOLD | SUPPRESSION CONTROL DECISION INFORMATION |
|---|---|---|---|---|---|
| 1 | 1/0/0 | 80% | 85% | 50% | ON |
| 1 | 1/0/1 | 80% | 80% | 50% | ON |
| 2 | 1/0/0 | 30% | 80% | 50% | OFF |
| 3 | 1/0/0 | 55% | 80% | 50% | OFF |

FIG. 6

| NEID | PORT ID | BAND USE RATIO | UPPER LIMIT THRESHOLD | LOWER LIMIT THRESHOLD | SUPPRESSION CONTROL DECISION INFORMATION |
|---|---|---|---|---|---|
| 1 | 1/0/0 | 80% | 85% | 50% | ON |
| 1 | 1/0/1 | 80% | 80% | 50% | ON |
| 2 | 1/0/0 | 85% | 80% | 50% | OFF |
| 3 | 1/0/0 | 55% | 80% | 50% | OFF |

FIG. 7

| NEID | PORT ID | BAND USE RATIO | UPPER LIMIT THRESHOLD | LOWER LIMIT THRESHOLD | SUPPRESSION CONTROL DECISION INFORMATION |
|---|---|---|---|---|---|
| 1 | 1/0/0 | 80% | 85% | 50% | ON |
| 1 | 1/0/1 | 80% | 80% | 50% | ON |
| 2 | 1/0/0 | 85% | 80% | 50% | ON |
| 3 | 1/0/0 | 55% | 80% | 50% | OFF |

FIG. 8

| NEID | PORT ID | BAND USE RATIO | UPPER LIMIT THRESHOLD | LOWER LIMIT THRESHOLD | SUPPRESSION CONTROL DECISION INFORMATION |
|---|---|---|---|---|---|
| 1 | 1/0/0 | 80% | 85% | 50% | ON |
| 1 | 1/0/1 | 80% | 80% | 50% | ON |
| 2 | 1/0/0 | 40% | 80% | 50% | ON |
| 3 | 1/0/0 | 55% | 80% | 50% | OFF |

FIG. 9

| NEID | PORT ID | BANDWIDTH UTILIZATION | UPPER LIMIT THRESHOLD | LOWER LIMIT THRESHOLD | SUPPRESSION CONTROL DECISION INFORMATION |
|---|---|---|---|---|---|
| 1 | 1/0/0 | 80% | 85% | 50% | ON |
| 1 | 1/0/1 | 80% | 80% | 50% | ON |
| 2 | 1/0/0 | 40% | 80% | 50% | OFF |
| 3 | 1/0/0 | 55% | 80% | 50% | OFF |

FIG. 10

| NEID | PORT ID | BAND USE RATIO | UPPER LIMIT THRESHOLD | LOWER LIMIT THRESHOLD | SUPPRESSION CONTROL DECISION INFORMATION |
|---|---|---|---|---|---|
| 1 | 1/0/0 | 80% | 85% | 50% | ON |
| 1 | 1/0/1 | 80% | 80% | 50% | ON |
| 2 | 1/0/0 | 40% | 85% | 50% | OFF |
| 3 | 1/0/0 | 55% | 80% | 50% | OFF |

FIG. 11

| NEID | PORT ID | BAND USE RATIO | UPPER LIMIT THRESHOLD | LOWER LIMIT THRESHOLD | SUPPRESSION CONTROL DECISION INFORMATION |
|---|---|---|---|---|---|
| 1 | 1/0/0 | 80% | 85% | 50% | ON |
| 1 | 1/0/1 | 80% | 80% | 50% | ON |
| 2 | 1/0/0 | 40% | 75% | 50% | OFF |
| 3 | 1/0/0 | 55% | 80% | 50% | OFF |

NETWORK MONITORING CONTROL APPARATUS AND MANAGEMENT INFORMATION ACQUISITION METHOD

CROSS-REFERENCE TO RELATED APPLICATION(S)

This application is based upon and claims the benefit of priority of the prior Japanese Patent Application No. 2011-162627, filed on Jul. 25, 2011, the entire contents of which are incorporated herein by reference.

FIELD

The embodiments discussed herein relate to a network monitoring control apparatus and a management information acquisition method for a communication network.

BACKGROUND

Network components such as transmission devices etc. included in a communication network are managed and controlled by a network monitoring control apparatus.

The related art is disclosed in Japanese Laid-open Patent Publication No. 9-282252, Japanese Laid-open Patent Publication No. 2001-160013, etc.

SUMMARY

According to one aspect of the embodiments, a network monitoring control apparatus comprising: a traffic information acquisition unit to acquire traffic information of a network component included in a network; a decision information switching unit to set decision information for the network component based on a comparison result between the traffic information and one of a congestion decision threshold and a congestion recovery decision threshold of the network component; and a management information acquisition unit to acquire management information of the network component based on the decision information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an exemplary management table.
FIG. 6 is an exemplary management table.
FIG. 7 is an exemplary management table.
FIG. 8 is an exemplary management table.
FIG. 9 is an exemplary management table.
FIG. 10 is an exemplary management table.
FIG. 11 is an exemplary management table.

DESCRIPTION OF EMBODIMENT

Figure 1:
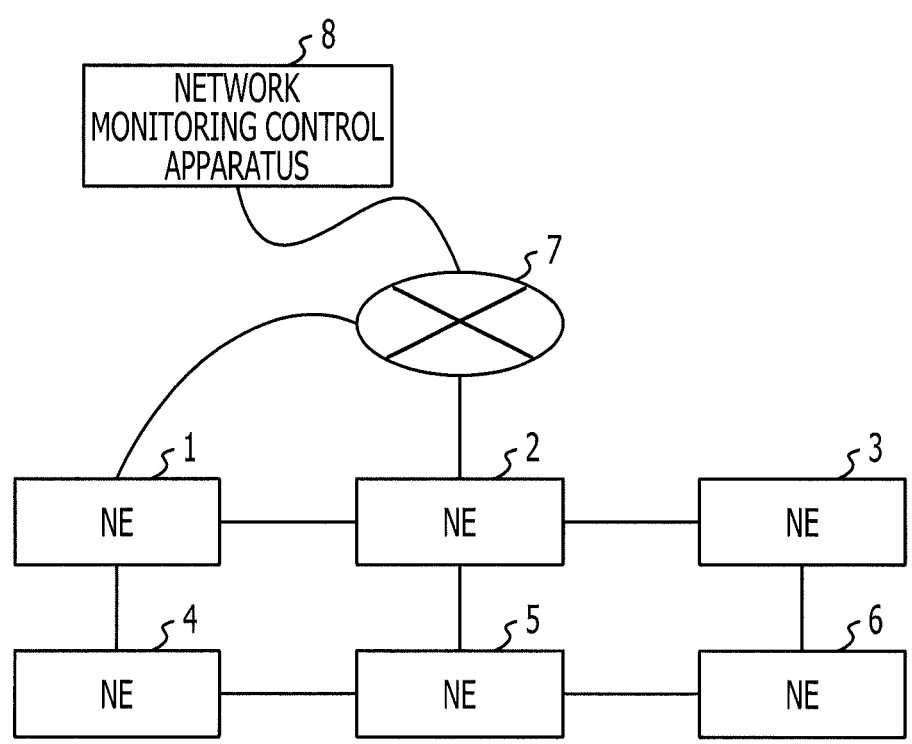
FIG. 1 is an exemplary communication network system.

FIG. 1 illustrates an exemplary communication network system.

Transmission devices (network elements: NEs) 1 to 6 included in the communication network are coupled with each other. For example, the transmission device 1 and 2 are coupled to a monitoring network 7 such as a wide area network (WAN) or local area network (LAN), and a network monitoring control apparatus 8 is coupled to the monitoring network 7. The network monitoring control apparatus 8 may be referred as an operation system (OPS).

The network monitoring control apparatus 8 receives a monitoring or control service request from the operator and monitors or controls the transmission devices 1 to 6. The network monitoring control apparatus 8 periodically executes a health check or polling, which uses a ping, for all the transmission devices 1 to 6 under control of it.

Each of the transmission devices 1 to 6 retains Management Information Base (MIB) information in its memory or database as its management information. If each of the transmission devices 1 to 6 to be managed detects its own failure, it notifies the network monitoring control apparatus 8 of the failure by sending a trap in the Simple Network Management Protocol (SNMP) to the network monitoring control apparatus 8, and updates MIB information.

In the Simple Network Management Protocol, confirmation of a reach may not be performed. Whether the trap by the transmission devices 1 to 6 reaches the network monitoring control apparatus 8 may not be ensured. Accordingly, the network monitoring control apparatus 8 addresses a failure to receive a trap notification.

The network monitoring control apparatus 8 periodically collects MIB information retained by the transmission devices. Accordingly, as the number of transmission devices managed by the network monitoring control apparatus 8 increases, the load on the network monitoring control apparatus 8 and the traffic between the network monitoring control apparatus 8 and the transmission devices may increase.

As illustrated in FIG. 1, the transmission devices (NEs) 1 to 6 are coupled with each other in the communication network system. The number of transmission devices may be any number, and it may be 6, for example.

Figure 2:
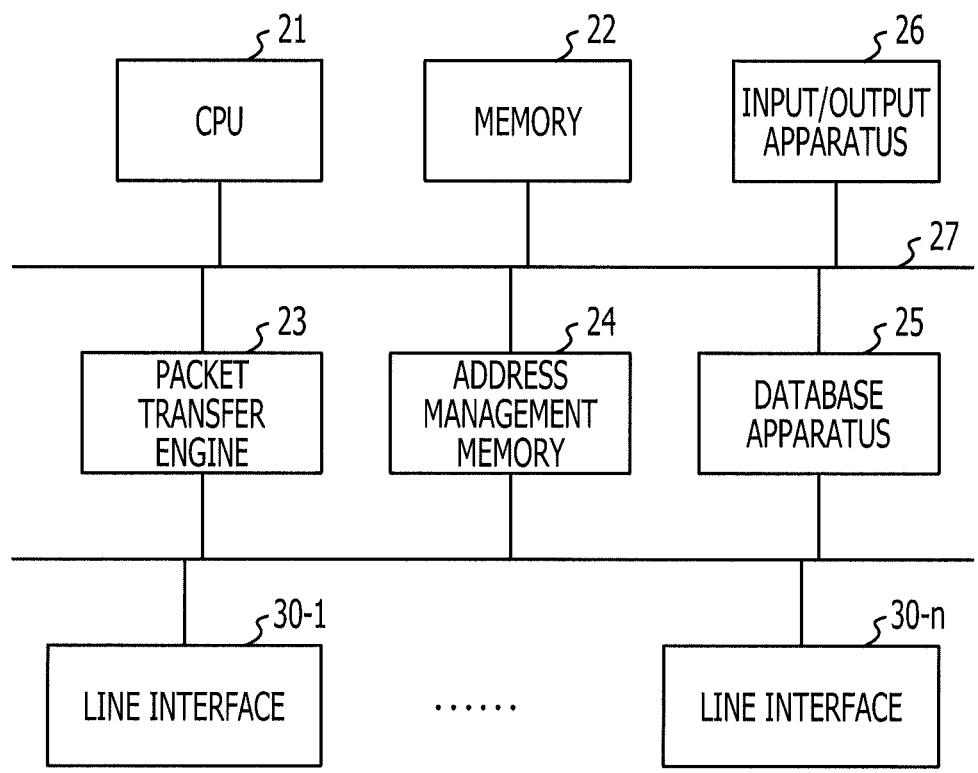
FIG. 2 is an exemplary network monitoring control apparatus.

FIG. 2 illustrates an exemplary network monitoring control apparatus. The network monitoring control apparatus 8 may have the hardware structure in FIG. 2. In FIG. 2, a CPU 21, a memory 22, a packet transfer engine 23, an address management memory 24, a database apparatus 25, and an input/output apparatus 26 are coupled with each other through an internal bus 27. The CPU 21 reads and executes a program stored in the memory 22 and monitors and controls the transmission devices 1 to 6 included in the communication network. The memory 22 may be used as a work area during execution of the program.

A plurality of line interfaces 30-1 to 30-*n* may be coupled to the packet transfer engine 23. The packet transfer engine 23 converts a monitoring command, control command, or message, which is generated by an execution of the program by the CPU 21, into, for example, SNMP packets corresponding to a control command or message in the Simple Network Management Protocol (SNMP), and sends them to the transmission devices 1 to 6 from the line interfaces 30-1 to 30-*n* through the monitoring network 7.

The packet transfer engine 23 converts SNMP packets such as an SNMP trap or MIB information received via the monitoring network 7 and the line interfaces 30-1 to 30-*n* from the transmission devices 1 to 6 into a format processed by a program executed by the CPU 21, and writes them to the database apparatus 25. The database apparatus 25 stores management table etc. generated under control of the CPU 21.

The address management memory 24 stores the addresses of the transmission devices 1 to 6 monitored by the network monitoring control apparatus 8. The database apparatus 25 stores information about traps received from the transmission devices 1 to 6, MIB information collected from the transmission devices 1 to 6, etc. The input/output apparatus 26 receives a monitoring or control service request from the operator and displays the operational state of the network monitoring control apparatus 8 for the operator.

Figure 3:
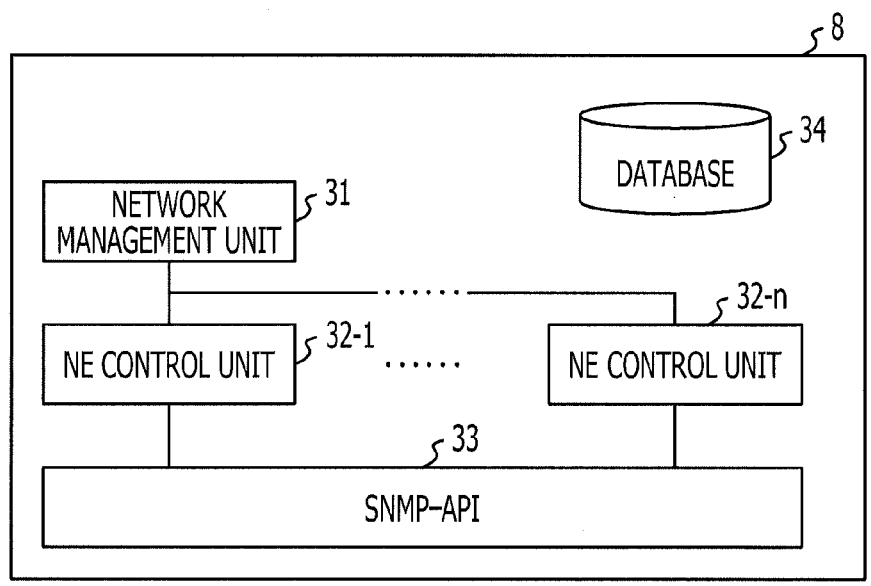
FIG. 3 is an exemplary network monitoring control apparatus.

FIG. 3 illustrates an exemplary network monitoring control apparatus. A network management unit 31 may manage or control all of the transmission devices 1 to 6. Each of NE control units 32-1 to 32-$n$ is provided for each transmission device. Under control of the network management unit 31, each of the NE control units 32-1 to 32-$n$ manages or controls each of the transmission devices 1 to 6. The NE control units 32-1 to 32-$n$ store MIB information collected from the transmission devices 1 to 6 in a database 34.

An SNMP/application interface (SNMP-API) 33 performs mutual conversion between an application executed by the CPU 21, for example, a program and SNMP. For example, a monitoring command, control command, or message output by the NE control units 32-1 to 32-$n$ is converted into SNMP packets by the SNMP/application interface 33 and supplied to the transmission devices 1 to 6. The SNMP packets supplied from the transmission devices 1 to 6 are converted by the SNMP/application interface 33 into the format of a control command or message used by the NE control units 32-1 to 32-$n$ and are supplied to the NE control units 32-1 to 32-$n$.

The database 34 stores MIB information of the NE control units 32-1 to 32-$n$ and stores a management table generated by the network management unit 31.

The network management unit 31 and the NE control units 32-1 to 32-$n$ may function based on an application executed by the CPU 21, for example, a program. The SNMP/application interface 33 may function based on the packet transfer engine 23. The database 34 may function based on the database apparatus 25.

FIG. 4 illustrates an exemplary management table. For example, the network management unit 31 in FIG. 3 may generate the management table in FIG. 4 and may store it in the database 34. An NEID in FIG. 4 indicates the identifier of each transmission device. A port ID indicates the identifier of each port, including a slot group number, slot number, and port number. For each port identified by an NEID and port ID, the band use ratio (%), upper limit threshold (%), and suppression control decision information (ON/OFF) may be set. The band use ratio field may be present or absent.

Figure 5:
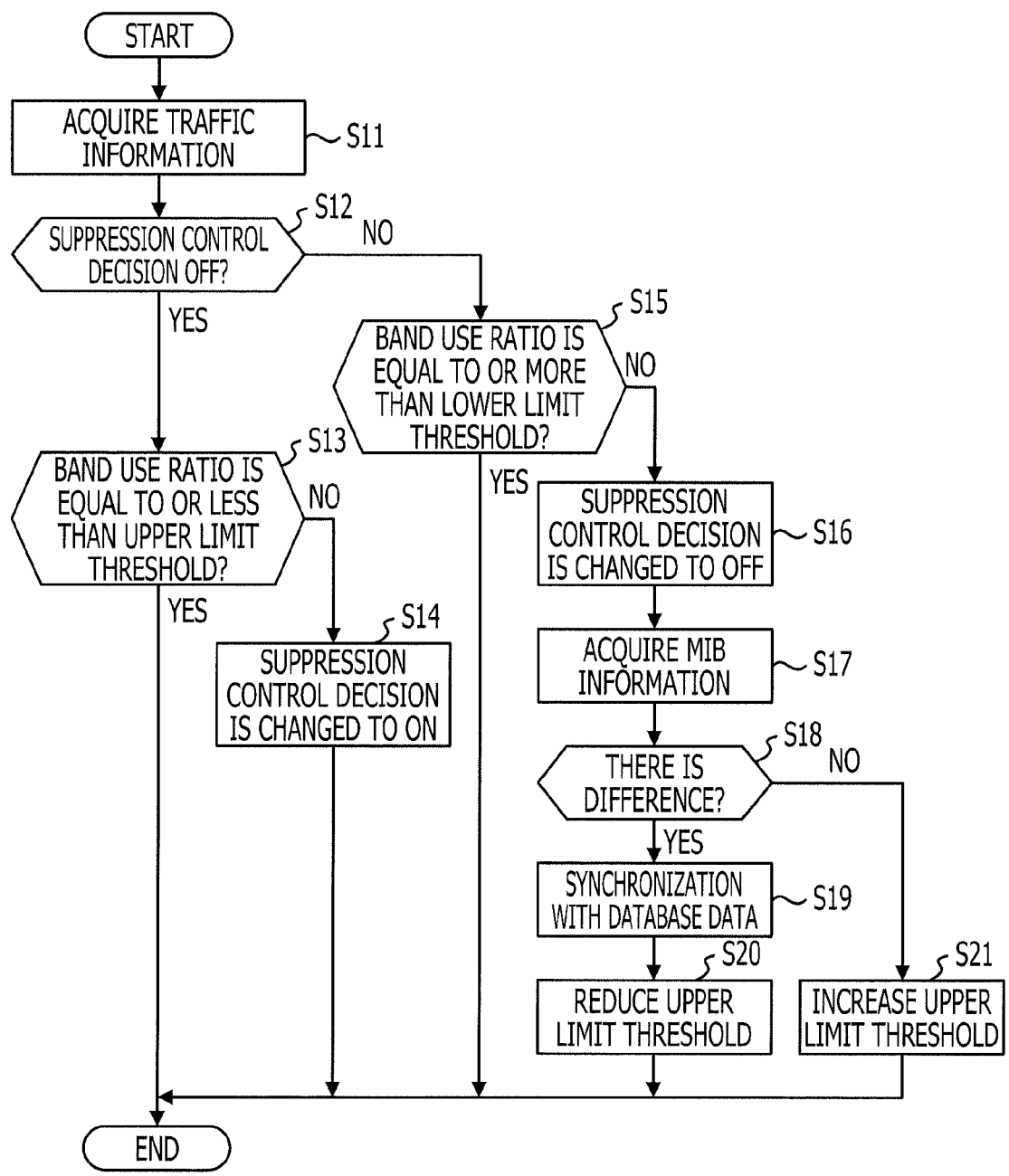
FIG. 5 is an exemplary decision of a trap reception failure.

FIG. 5 illustrates an exemplary decision of a trap reception failure. The network management unit 31 in FIG. 3 may perform the decision of a trap reception failure described in FIG. 5. The decision of a trap reception failure may be performed periodically for each transmission device at predetermined intervals ranging from several seconds to tens of minutes. In an operation S11, the band use ratio at that time, which is traffic information of all ports of a transmission device, for example, the ratio of the current traffic amount to the maximum traffic amount may be acquired and may be stored in the band use ratio field of each port in the management table in FIG. 4.

An operation S12 and subsequent operations may be executed for each port. In the operation S12, a decision is made as to whether the suppression control decision information in the management table in FIG. 4 is off for each port. When the suppression control decision information for a port is OFF, the process proceeds to an operation S13. In the operation S13, a decision is made as to whether the band use ratio is equal to or less than the upper limit threshold for the port in the management table in FIG. 4. The upper limit threshold may correspond to the congestion decision threshold. When the band use ratio is equal to or less than the upper limit threshold, it is decided that there is no congestion for the port and there is no trap reception failure and the process ends. When the band use ratio exceeds the upper limit threshold, it is decided that a trap reception failure may be caused because of congestion for the port. In an operation S14, the suppression control decision information for the port in the management table is changed to ON.

When suppression control decision information is ON in the operation S12, a decision is made as to whether the band use ratio is equal to or more than the lower limit threshold of the port in the management table in FIG. 4 in an operation S15. The lower limit threshold may correspond to the congestion recovery decision threshold. When the band use ratio is equal to or more than the lower limit threshold, since the port does not recover from congestion, the acquisition of MIB information may cause congestion. Accordingly, the process ends.

When the band use ratio is less than the lower limit threshold, since the port recovers from congestion and the occurrence of congestion caused by the acquisition of MIB information is reduced, suppression control decision information for the port is changed to OFF in an operation S16. In an operation S17, MIB information of the port is acquired from a transmission device. MIB information may be acquired at the time of recovery from congestion.

In an operation S18, a decision is made as to whether there is a difference between the acquired MIB information of the port and the MIB information of the port stored in the database 34. When there is a difference, the MIB information of the port stored in the database 34 is updated in an operation S19 by the acquired MIB information of the port, so that the MIB information in the network monitoring control apparatus is synchronized with the MIB information in the transmission device. Since a trap reception failure occurred when the band use ratio exceeded the upper limit threshold, the upper limit threshold of the port in the management table in FIG. 4 may be reduced by a predetermined amount, for example, several percents in an operation S20. Then, the process ends.

When there is no difference in the operation S18, the upper limit threshold of the port in the management table in FIG. 4 may be increased by a predetermined amount, for example, several percents in an operation S21. If the band use ratio exceeds the upper limit threshold, a trap reception failure may be reduced. Then, the process ends. The variable range of the upper limit threshold in the operations S20 and S21 may be set to range from 70% to 90%.

FIGS. 6 to 11 indicate an exemplary management table. In the state of the management table depicted in FIG. 4, the decision of a trap reception failure may be performed for the transmission device with an NEID of 2. The band use ratio may be 85% when the NEID is 2 and the port ID is 1/0/0. The management table in FIG. 6 may be set based on the acquisition when the band use ratio is 85%. Since the band use ratio is 85%, which is more than the upper limit threshold (80%), the operation S14 may be executed, suppression control decision information may become ON, and the management table in FIG. 7 may be set.

When a certain period of time has elapsed in the management table in FIG. 7, the decision of a trap reception failure may be performed for the transmission device with an NEID of 2. The band use ratio may be 40% when the NEID is 2 and the port ID is 1/0/0. The management table in FIG. 8 may be set based on the acquisition when the band use ratio is 40%. Since the band use ratio is 40%, which is less than the lower limit threshold (50%), the operation S16 may be executed, suppression control decision information may become OFF, and the management table in FIG. 9 may be set.

In the operation S18, a decision is made as to whether there is a difference between the acquired MIB information of the port and the MIB information of the port stored in the database 34. When there is no difference, the upper limit threshold is increased in the operation S21 and the management table in FIG. 10 is set. The predetermined increase value may be 5%.

When there is a difference, the upper limit threshold is decreased in the operation S20 and the management table in FIG. 11 is set. The predetermined reduction value may be 5%.

The network monitoring control apparatus 8 periodically acquires traffic information from the transmission devices 1 to 6. The acquired traffic information is stored in the database 34 of the network monitoring control apparatus 8. If the acquired traffic information exceeds the upper limit threshold retained in the database 34, it is decided that a trap reception failure may have occurred and, after the traffic information falls short of the lower limit threshold, the MIB information that the network monitoring control apparatus 8 may have failed to receive is acquired. When a lot of MIB information is periodically acquired, a load on network monitoring control apparatus may increase as the number of NEs to be managed increases. When, for example, the MIB information to be periodically acquired is traffic data, a load on the network monitoring control apparatus may be reduced.

Since the occurrence of a trap reception failure is reduced when a traffic amount is a little, periodical acquisition may not be performed. In the case of occurrence of congestion caused by an increase in traffic, which is a factor of a trap reception failure, trap-related MIB information is acquired after recovery from congestion. Communication load between the transmission device and the network monitoring control apparatus may be reduced.

Whether there is a trap reception failure is determined based on the difference between the acquired MIB information and the MIB information stored in the database 34. The upper limit threshold reduces when there is a trap reception failure and the upper limit threshold increases when there is no trap reception failure. The upper limit threshold may be changed based on actual conditions.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A network monitoring control apparatus comprising:
   a CPU; and
   a memory configured to store a program to be executed by the CPU, to perform:
   acquiring traffic information of a network component included in a network;
   selecting one of a first comparison and a second comparison based on whether a decision information value for the network component is a first value or a second value;
   performing the first comparison to compare the traffic information with a congestion decision threshold when the decision information value is the second value and setting the decision information value to the first value when the traffic information exceeds the congestion decision threshold of the network component;
   performing the second comparison to compare the traffic information with a congestion recovery decision threshold of the network component when the decision information value is the first value and setting the decision information value to the second value when the traffic information is less than the congestion recovery decision threshold; and
   acquiring management information of the network component when setting the decision information value to the second value.

2. The network monitoring control apparatus according to claim 1, wherein it is decided that there is no congestion when the traffic information is equal to or less than the congestion decision threshold of the network component.

3. The network monitoring control apparatus according to claim 2, wherein the management information is acquired when the decision information value switches from the first value to the second value.

4. The network monitoring control apparatus according to claim 1, further comprising:
   a storage device configured to store the management information of the network component, wherein the CPU further performs:
   obtaining a difference between the acquired management information of the network component and the management information of the network component stored in the storage device; and
   controlling the congestion decision threshold based on the difference.

5. The network monitoring control apparatus according to claim 4, wherein the congestion decision threshold is reduced when the difference exists and the congestion decision threshold is increased when the difference does not exist.

6. The network monitoring control apparatus according to claim 1, wherein traffic information about all ports of the network component is acquired and the decision information value is provided for each of the ports.

7. A management information acquisition method comprising:
   acquiring traffic information of a network component included in a network;
   selecting one of a first comparison and a second comparison based on whether a decision information value for the network component is a first value or a second value;
   performing the first comparison to compare the traffic information with a congestion decision threshold when the decision information value is the second value and setting the decision information value to the first value when the traffic information exceeds the congestion decision threshold of the network component;
   performing the second comparison to compare the traffic information with a congestion recovery decision threshold of the network component when the decision information value is the first value and setting the decision information value to the second value when the traffic information is less than the congestion recovery decision threshold; and
   acquiring management information of the network component when setting the decision information value to the second value.

8. The management information acquisition method according to claim 7, wherein it is decided that there is no congestion when the traffic information is equal to or less than the congestion decision threshold of the network component.

9. The management information acquisition method according to claim 8, further comprising acquiring the management information when the decision information value switches from the first value to the second value.

10. The management information acquisition method according to claim 7, further comprising;
   acquiring a difference between the acquired management information of the network component and management information of the network component to be stored in a storage device; and
   controlling the congestion decision threshold based on the difference.

11. The management information acquisition method according to claim 10, further comprising:
   reducing the congestion decision threshold when the difference exists; and
   increasing the congestion decision threshold when the difference does not exist.

12. The management information acquisition method according to claim 7, further comprising:
   acquiring traffic information of all ports of the network component; and
   providing the decision information value for each of the ports.

* * * * *

UNITED STATES PATENT AND TRADEMARK OFFICE
CERTIFICATE OF CORRECTION

PATENT NO. : 9,021,089 B2
APPLICATION NO. : 13/476291
DATED : April 28, 2015
INVENTOR(S) : Toshihiro Nakamura et al.

Page 1 of 1

It is certified that error appears in the above-identified patent and that said Letters Patent is hereby corrected as shown below:

In the Claims

Column 7, Line 10, In Claim 10, delete "comprising;" and insert -- comprising: --, therefor.

Signed and Sealed this
Twenty-first Day of July, 2015

Michelle K. Lee
*Director of the United States Patent and Trademark Office*